United States Patent
Asnaashari et al.

(10) Patent No.: US 8,683,173 B2
(45) Date of Patent: *Mar. 25, 2014

(54) LOGICAL ADDRESS OFFSET IN RESPONSE TO DETECTING A MEMORY FORMATTING OPERATION

(75) Inventors: Mehdi Asnaashari, Danville, CA (US); William E. Benson, San Mateo, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/459,923

(22) Filed: Apr. 30, 2012

(65) Prior Publication Data

US 2012/0215972 A1     Aug. 23, 2012

Related U.S. Application Data

(63) Continuation of application No. 12/356,765, filed on Jan. 21, 2009, now Pat. No. 8,180,995.

(51) Int. Cl.
*G06F 12/10* (2006.01)

(52) U.S. Cl.
USPC ........................... 711/206; 711/202; 711/221

(58) Field of Classification Search
USPC ......................................... 711/203, 206, 221
See application file for complete search history.

(56) References Cited

U.S. PATENT DOCUMENTS

| | | | |
|---|---|---|---|
| 5,845,313 A | 12/1998 | Estakhri et al. | |
| 5,907,856 A | 5/1999 | Estakhri et al. | |
| 5,930,815 A | 7/1999 | Estakhri et al. | |
| 6,094,693 A | 7/2000 | Haneda | |
| 6,125,435 A | 9/2000 | Estakhri et al. | |
| 6,389,503 B1 * | 5/2002 | Georgis et al. | 711/4 |
| 6,401,166 B2 | 6/2002 | Chiba | |
| 6,405,295 B1 | 6/2002 | Bando | |
| 6,535,995 B1 * | 3/2003 | Dobbek | 714/6.13 |
| 6,725,322 B1 | 4/2004 | Shiraishi | |
| 7,836,247 B2 * | 11/2010 | Forrer et al. | 711/112 |
| 8,078,797 B2 | 12/2011 | Estakhri et al. | |
| 2001/0048121 A1 | 12/2001 | Mizushima et al. | |
| 2005/0080985 A1 | 4/2005 | Sasaki | |
| 2005/0273552 A1 | 12/2005 | Brazis et al. | |

(Continued)

FOREIGN PATENT DOCUMENTS

| | | |
|---|---|---|
| CN | 1273713 A | 11/2000 |
| JP | 2005-339438 | 8/2005 |

(Continued)

OTHER PUBLICATIONS

Korean Preliminary Rejection for related Korean Application No. 10-2011-7019228, mailed Mar. 29, 2013, (7 pgs.).

(Continued)

*Primary Examiner* — John Lane
(74) *Attorney, Agent, or Firm* — Brooks, Cameron & Huebsch, PLLC

(57) ABSTRACT

The present disclosure includes methods, devices, and systems for a logical address offset. One method embodiment includes detecting a memory unit formatting operation. Subsequently, in response to detecting the formatting operation, the method includes inspecting format information on the memory unit, calculating a logical address offset, and applying the offset to a host logical address.

31 Claims, 4 Drawing Sheets

(56) References Cited

U.S. PATENT DOCUMENTS

| | | | |
|---|---|---|---|
| 2006/0136662 A1* | 6/2006 | Forrer et al. | 711/112 |
| 2007/0143566 A1 | 6/2007 | Gorobets | |
| 2008/0098161 A1 | 4/2008 | Ito | |
| 2008/0155178 A1 | 6/2008 | Sinclair | |
| 2008/0172427 A1 | 7/2008 | Ito | |
| 2009/0055619 A1* | 2/2009 | Southerland et al. | 711/200 |
| 2009/0235017 A1 | 9/2009 | Estakhri et al. | |
| 2010/0153617 A1 | 6/2010 | Miroshnichenko et al. | |
| 2010/0250839 A1* | 9/2010 | Ito et al. | 711/103 |
| 2011/0036115 A1* | 2/2011 | Lee et al. | 62/344 |

FOREIGN PATENT DOCUMENTS

| | | |
|---|---|---|
| JP | 2005-216119 | 11/2005 |
| JP | 2006-040170 | 9/2006 |
| TW | 200841762 A | 12/2008 |
| TW | 200900929 A | 1/2009 |
| WO | 0118640 A1 | 3/2001 |
| WO | 2008082996 A1 | 7/2008 |
| WO | 2009005792 A2 | 1/2009 |

OTHER PUBLICATIONS

European Search Report for related European Application No. 10738832.4, mailed Jul. 20, 2012, (6 pages).

International Search Report and Written Opinion for related PCT Application PCT/US2010/000095, mailed Aug. 24, 2010 (10 pgs.).

First Office Action Issued by State Intellectual Property Office for related Chinese Pat. App. No. 201080005160.5, issued Aug. 26, 2013, (5 pgs.).

Notice of Rejection Ground by Japan Patent Office for related Japanese Pat. App. No. 2011-546262, issued Aug. 27, 2013, (3 pgs.).

Communication Pursuant to Article 94(3) EPC by European Patent Office for related European Pat. App. No. 10738832.4, issued Aug. 28, 2013, (5 pgs.).

Office Action of the Intellectual Property Office for related ROC(Taiwan) Pat. App. No. 099101251, issued Jun. 4, 2013, (7 pgs.).

Notice of Final Rejection from Korean patent application No. 10-2011-7019228, dated Oct. 30, 2013, 5 pp.

Second Notice of Final Rejection from Korean patent application No. 10-2011-7019228, dated Dec. 12, 2013, 6 pp.

Allowance Decision with Search Report from Taiwan patent application No. 099101251, dated Dec. 3, 2013, 5 pp.

* cited by examiner

US 8,683,173 B2

LOGICAL ADDRESS OFFSET IN RESPONSE TO DETECTING A MEMORY FORMATTING OPERATION

PRIORITY APPLICATION INFORMATION

This application is a Continuation of U.S. application Ser. No. 12/356,765, filed Jan. 21, 2009, which is incorporated herein by reference.

TECHNICAL FIELD

The present disclosure relates generally to semiconductor memory devices, methods, and systems, and more particularly, to a logical address offset.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored information when not powered and can include NAND flash memory, NOR flash memory, read only memory (ROM), Electrically Erasable Programmable ROM (EEPROM), Erasable Programmable ROM (EPROM), and phase change random access memory (PCRAM), among others.

Memory devices can be combined together to form a solid state drive (SSD). A solid state drive can include non-volatile memory, e.g., NAND flash memory and NOR flash memory, and/or can include volatile memory, e.g., DRAM and SRAM, among various other types of non-volatile and volatile memory.

An SSD can be used to replace hard disk drives as the main storage device for a computer, as the solid state drive can have advantages over hard drives in terms of performance, size, weight, ruggedness, operating temperature range, and power consumption. For example, SSDs can have superior performance when compared to magnetic disk drives due to their lack of moving parts, which may avoid seek time, latency, and other electro-mechanical delays associated with magnetic disk drives. SSD manufacturers can use non-volatile flash memory to create flash SSDs that may not use an internal battery supply, thus allowing the drive to be more versatile and compact.

An SSD can include a number of memory devices, e.g., a number of memory chips (as used herein, "a number of" something can refer to one or more of such things, e.g., a number of memory devices can refer to one or more memory devices). The collection of memory devices on an SSD can be referred to as a memory unit. As one of ordinary skill in the art will appreciate, a memory chip can include a number of dies. Each die can include a number of memory arrays and peripheral circuitry thereon. The memory arrays can include a number of memory cells organized into a number of physical blocks, and the physical blocks can be organized into a number of pages.

Some format utilities may be unaware of the physical characteristics of the memory arrays that make up an SSD. Thus, when an SSD is formatted with such a utility for a particular file system, the memory unit may be divided into a number of areas, each having a starting logical address that may or may not correspond to a physical boundary such as a page or block of memory cells. For example, a user data area of the file system may have a starting logical block address that can map to the middle of a page or block of memory cells.

DETAILED DESCRIPTION

Figure 1:
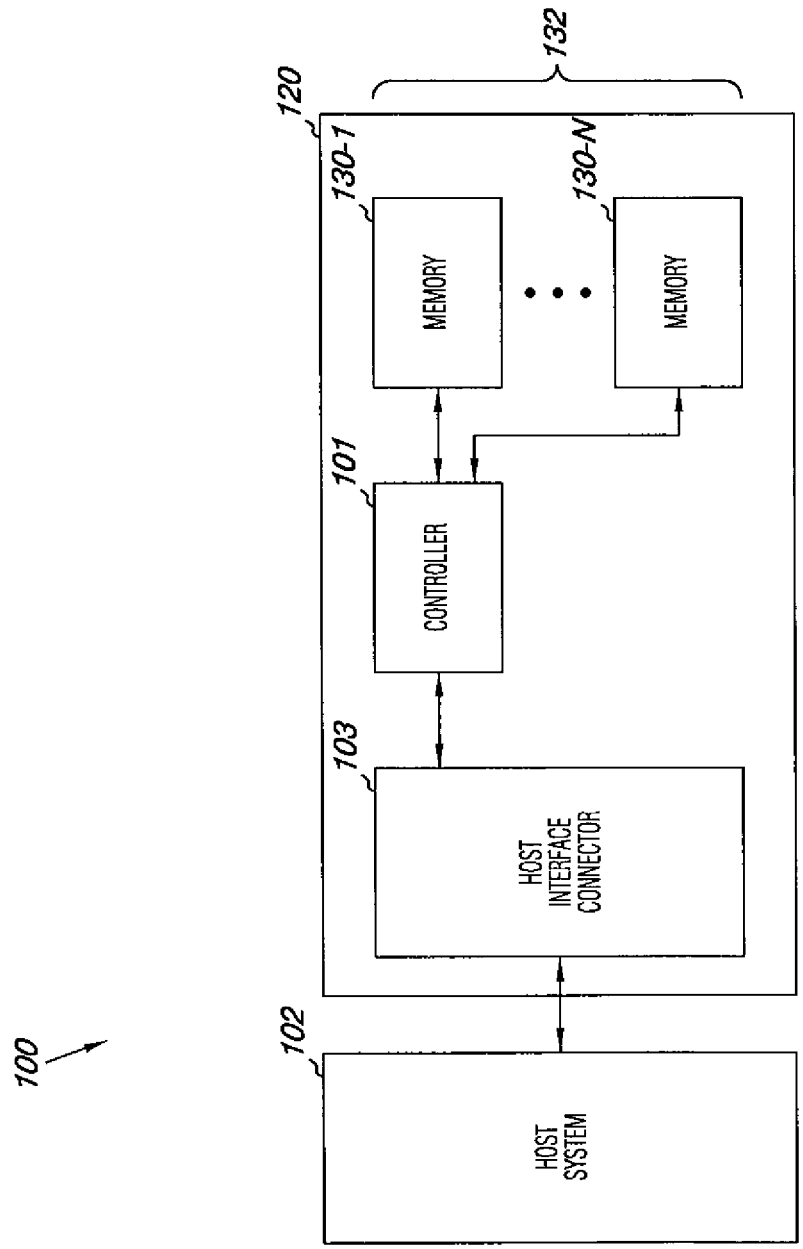
FIG. 1 is a functional block diagram of an electronic memory system that can be operated in accordance with one or more embodiments of the present disclosure.

The present disclosure includes methods, devices, and systems for a logical address offset. One method embodiment includes detecting a memory unit formatting operation. Subsequently, in response to detecting the formatting operation, the method includes inspecting format information on the memory unit, calculating a logical address offset, and applying the offset to a host logical address.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designators "N," "M," "R," and "S," particularly with respect to reference numerals in the drawings, indicates that a number of the particular feature so designated can be included with one or more embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, 101 may reference element "01" in FIG. 1, and a similar element may be referenced as 201 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present invention, and should not be taken in a limiting sense.

FIG. 1 is a functional block diagram of a computing system 100 including a memory system 120 in accordance with one or more embodiments of the present disclosure. In the embodiment illustrated in FIG. 1, the memory system 120, e.g., a solid state drive (SSD), can include a memory controller 101, a host interface connector 103, and one or more solid state memory devices 130-1, . . . , 130-N. The solid state memory devices 130-1, . . . , 130-N are collectively referred to herein as a memory unit 132. A file system can be formatted to the memory unit 132 such that the memory unit 132 can provide a storage volume for data storage. In one or more embodiments, the memory system 120, including the host interface connector 103, the memory unit 132, and the memory controller 101 can be part of a discrete memory module, e.g., a printed circuit board.

As illustrated in FIG. 1, the memory controller 101 can be coupled to the host interface connector 103 and to the solid state memory devices 130-1, . . . , 130-N. The host interface connector 103 can be used to communicate information between the memory system 120 and another device such as a host system 102. Host system 102 can include a memory access device, e.g., a processor. One of ordinary skill in the art will appreciate that "a processor" can intend one or more processors, such as a parallel processing system, a number of coprocessors, etc. Examples of host systems include laptop computers, personal computers, digital cameras, digital recording and playback devices, mobile telephones, PDAs, memory card readers, interface hubs, and the like. For one or more embodiments, the host interface connector 103 can be in the form of a standardized interface. For example, when the memory system 120 is used for data storage in a computing system 100, the host interface connector 103 can be a serial advanced technology attachment (SATA), peripheral component interconnect express (PCIe), or a universal serial bus (USB), among other connectors and interfaces. In general, however, host interface connector 103 can provide an interface for passing control, address, data, and other signals between the memory system 120 and a host system 102 having compatible receptors for the host interface connector 103.

The memory controller 101 can communicate with the solid state memory devices 130-1, . . . , 130-N to read, write, and erase data, among other operations. Memory controller 101 can have circuitry that may be one or more integrated circuits and/or discrete components. For one or more embodiments, the circuitry in memory controller 101 may include control circuitry for controlling access across the solid state memory devices 130-1, . . . , 130-N and circuitry for providing a translation layer between a host system 102 and the memory system 120. Thus, a memory controller could selectively couple an I/O connection (not shown in FIG. 1) of a solid state memory device 130-1, . . . , 130-N to receive the appropriate signal at the appropriate I/O connection at the appropriate time. Similarly, the communication protocol between a host system 102 and the memory system 120 may be different than what is required for access of a solid state memory device 130-1, . . . , 130-N. Memory controller 101 could then translate the commands received from a host into the appropriate commands to achieve the desired access to a solid state memory device 130-1, . . . , 130-N.

A solid state memory device 130-1, . . . , 130-N can include one or more arrays of memory cells, e.g., non-volatile memory cells. The arrays can be flash arrays with a NAND architecture, for example. In a NAND architecture, the control gates of memory cells of a "row" can be coupled with a word line, while the memory cells can be coupled in series source to drain in a "string" between a select gate source transistor and a select gate drain transistor. The string can be connected to a bit line by the select gate drain transistor. The use of the terms "row" and "string" implies neither a linear nor an orthogonal arrangement of memory cells. As will be appreciated by those of ordinary skill in the art, the manner of connection of the memory cells to the bit lines and source lines depends on whether the array is a NAND architecture, a NOR architecture, or some other memory array architecture.

The embodiment of FIG. 1 can include additional circuitry that is not illustrated so as not to obscure embodiments of the present disclosure. For example, the memory system 120 can include address circuitry to latch address signals provided over I/O connections through I/O circuitry. Address signals can be received and decoded by a row decoder and a column decoder to access the solid state memory devices 130-1, . . . , 130-N. It will be appreciated by those skilled in the art that the number of address input connections can depend on the density and architecture of the solid state memory devices 130-1, . . . , 130-N.

Figure 2:
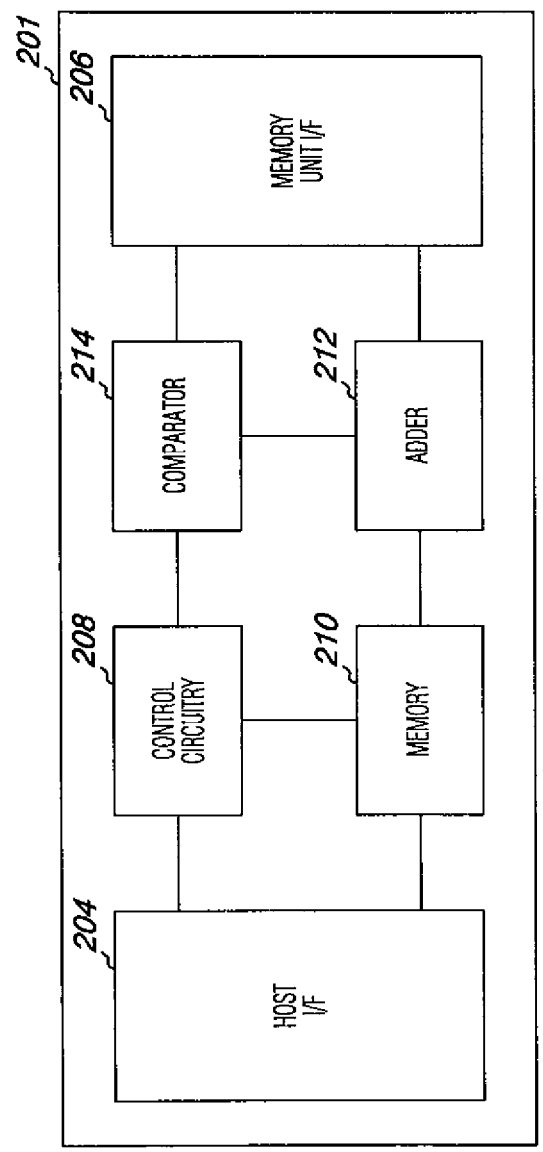
FIG. 2 is a functional block diagram of a memory controller in accordance with one or more embodiments of the present disclosure.

FIG. 2 is a functional block diagram of a memory controller 201 in accordance with one or more embodiments of the present disclosure. Memory controller 201 can be analogous to memory controller 101 illustrated in FIG. 1. Memory controller 201 includes a host interface (I/F) 204 that can interface with a host system, e.g., through a host interface connector 103 illustrated in FIG. 1. The host I/F is coupled to control circuitry 208 and controller memory 210 of the memory controller 201. The control circuitry 208 can be coupled to the controller memory 210 and to a comparator 214. The controller memory 210 can be coupled to an adder 212. The comparator 214 and adder 212 can be coupled together and to a memory unit interface (I/F) 206. The memory controller can be coupled to a memory unit, e.g., memory unit 132 illustrated in FIG. 1, through the memory unit I/F 206.

Memory controller 201 can include additional components not illustrated here so as not to obscure embodiments of the present disclosure. Furthermore, memory controller 201 can have differing arrangements of the illustrated components without departing from the scope of the present disclosure. Memory controller 201 may take the form of an integrated circuit, where the components illustrated in FIG. 2 represent the functionality of the integrated circuit, or the memory controller 201 can be a combination of discrete components.

Host I/F 204 can send signals to and/or receive signals from a host system, e.g., host system 102 in FIG. 1. Memory unit I/F 206 can send signals to and/or receive signals from a memory unit, e.g., memory unit 132 in FIG. 1. Control circuitry 208 can decode signals provided from a host system via host I/F 204. These signals can include various reading, writing, erasing, or other operating signals for the memory unit. Controller memory 210 can be memory local to the controller 201 and can be either volatile or non-volatile memory such as DRAM, EPROM, EEPROM, flash, etc. Controller memory 210 can be configured to store one or more logical address offsets as described herein. It will be appreciated by those skilled in the art that additional circuitry and control signals can be provided, and that the device detail of FIG. 2 has been reduced to facilitate illustration.

Comparator 214 can include one or more logical address range comparators configured to compare a host logical address with a range of logical addresses corresponding to a number of areas of a formatted file system on a memory unit. For example, the comparator 214 can be used to determine whether a host logical address is within a range of logical addresses corresponding to a user data area, as described in more detail herein. As will be appreciated, a host logical address can be a host logical block address (LBA), which is described in more detail herein. For ease of reference, the term "host LBA" will be used herein and does not exclude the use of other types of host logical addresses with one or more embodiments of the present disclosure.

Adder 212 can be configured to add an offset, e.g., an offset stored in controller memory 210, to a logical address received via host I/F 204. In one or more embodiments, the adder 212 can add the offset to the host LBA prior to the host LBA being sent across the memory unit I/F 206.

Controller 201 can be configured such that control circuitry 208 can calculate a logical address offset and store the offset in controller memory 210. For example, one or more logical address offsets can be stored in memory 210 until the control circuitry 208 detects a formatting operation. The controller 201 can receive host LBAs from the host I/F 204, e.g., in response to a host system attempting to access a portion of a memory unit associated with the host LBAs. When comparator 214 detects a host LBA within a particular range of addresses, e.g., a range corresponding to a user data area of a file system, the adder 212 can add the offset to the host LBA and pass the offset host LBA across the memory unit I/F 206. Such operations performed by controller 201 may be transparent to the host system and are discussed in more detail herein.

In one or more embodiments, various physical parameters associated with the memory unit, e.g., according to inspected format information, can be stored in controller memory 210 and can be communicated to control circuitry 208. Examples of physical parameters include memory unit size, page size, block size, file system type, media type, and memory cell type, among other parameters.

Figure 3:
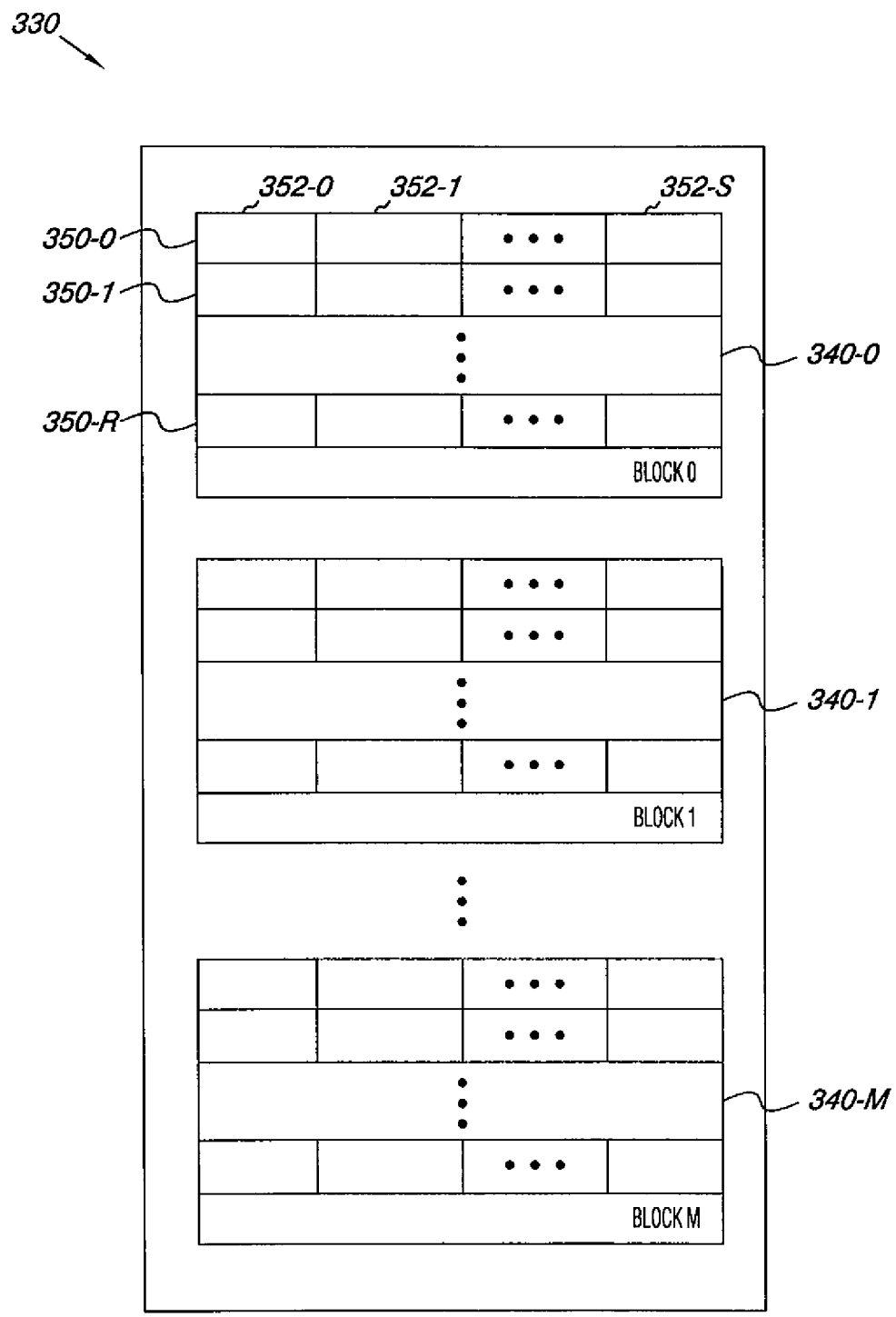
FIG. 3 illustrates a diagram of a portion of a memory device in accordance with one or more embodiments of the present disclosure.

FIG. 3 illustrates a diagram of a portion of a memory device 330 in accordance with one or more embodiments of the present disclosure. Although not shown in FIG. 3, one of ordinary skill in the art will appreciate that the memory device 330 can be located on a semiconductor die along with various peripheral circuitry associated with the operation thereof. Memory device 330 can include one or more arrays of memory cells.

As shown in FIG. 3, memory device 330 can include a number of physical blocks 340-0 (BLOCK 0), 340-1 (BLOCK 1), . . . , 340-M (BLOCK M) of memory cells. In the example shown in FIG. 3, the indicator "M" is used to indicate that the memory device 330 can include a number of physical blocks. As an example, the number of physical blocks in memory device 330 may be 128 blocks, 4,096 blocks, or 32,768 blocks, however embodiments are not limited to a particular number or multiple of physical blocks in a memory device. Further, embodiments are not limited to the type of memory used in the array, e.g., non-volatile, volatile, etc. In the embodiment illustrated in FIG. 3, the memory device 330 can be, for example, a NAND flash memory device 330 such that, for example, the memory cells in each physical block 340-0, 340-1, . . . , 340-M can be erased together as a unit, e.g., the cells in each physical block can be erased in a substantially simultaneous manner. For instance, the cells in each physical block can be erased together in a single erasing operation.

The indicator "R" is used to indicate that a physical block, e.g., 340-0, 340-1, . . . , 340-M, can include a number of rows. In some embodiments, the number of rows, e.g., word lines, in each physical block can be 32, but embodiments are not limited to a particular number of rows 350-0, 350-1, . . . , 350-R per physical block. As one of ordinary skill in the art will appreciate, each row 350-0, 350-1, . . . , 350-R can include one or more physical pages, e.g., an even page and an odd page. A physical page refers to a unit of writing and/or reading, e.g., a number of cells that are written and/or read together or as a functional group of memory cells. Accordingly, an even page and an odd page can be written and/or read with separate writing and/or reading operations. For embodiments including multilevel cells (MLC), a physical page can be logically divided into an upper page and a lower page of data. For example, one memory cell can contribute one or more bits to an upper page of data and one or more bits to a lower page of data. Accordingly, an upper page and a lower page of data can be written and/or read as part of one writing and/or reading operation, as the logical upper page and logical lower page are both part of the same physical page. For ease of illustration, each row 350-0, 350-1, . . . , 350-R, in FIG. 3 includes only one physical and logical page, however embodiments are not so limited.

In one or more embodiments of the present disclosure, and as shown in FIG. 3, a page can store data in a number of sectors 352-0, 352-1, . . . , 352-S. The indicator "S" is used to indicate that a page can include a number of sectors. Each sector 352-0, 352-1, . . . , 352-S can store system and/or user data and can include overhead information, such as error correction code (ECC) information, and logical block address (LBA) information. As one of ordinary skill in the art will appreciate, logical block addressing is a scheme that can be used by a host for identifying a sector of information, e.g., each sector can correspond to a unique LBA. In one or more embodiments, a sector is the smallest addressable portion of a storage volume. As an example, a sector of data can be a number of bytes of data, e.g., 256 bytes, 512 bytes, or 1,024 bytes. For example, an SSD can have 4, 8, or 16 sectors in a page, where a sector can be 512 bytes, and an SSD can have 128, 256, or 512 pages per physical block, therefore physical block sizes are 131072 bytes, 262144 bytes, and 524288 bytes. Embodiments are not limited to these examples.

It is noted that other configurations for the physical blocks 340-0, 340-1, . . . , 340-M, rows 350-0, 350-1, . . . , 350-R, sectors 352-0, 352-1, . . . , 352-S, and pages are possible. For example, the rows 350-0, 350-1, . . . , 350-R of the physical blocks 340-0, 340-1, . . . , 340-M can each store data corresponding to a single sector which can include, for example, more or less than 512 bytes of data.

Figure 4:
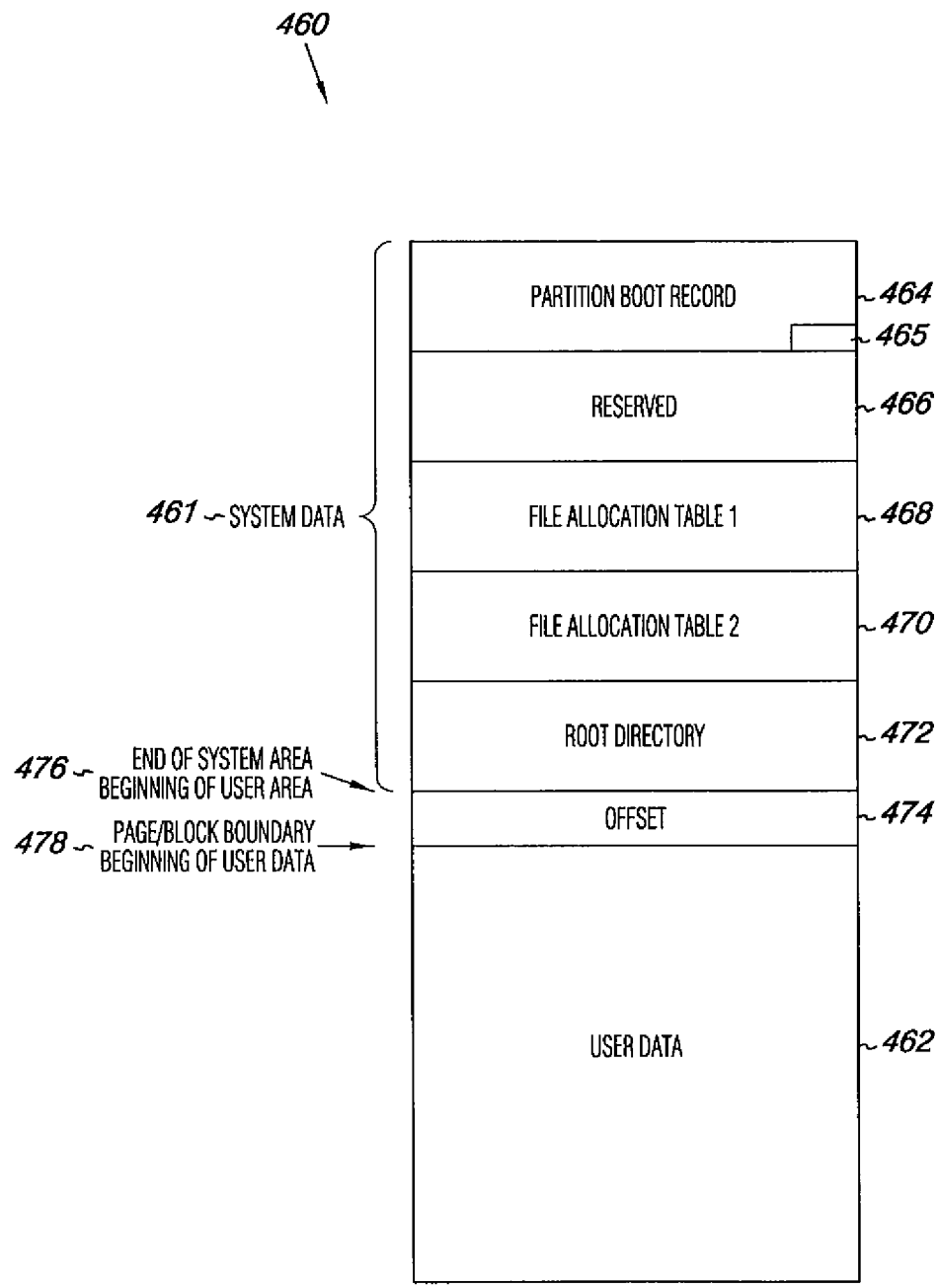
FIG. 4 illustrates a block diagram of a memory unit formatted with a file system in accordance with one or more embodiments of the present disclosure.

FIG. 4 illustrates a block diagram of a memory unit formatted with a file system 460 in accordance with one or more embodiments of the present disclosure. As described herein, the formatted memory unit can provide a storage volume. Although the embodiment illustrated in FIG. 4 includes a file allocation table (FAT) file system, embodiments of the present disclosure are not limited to a particular type of file system. For example, one or more embodiments of the present disclosure can be used with other file systems such as New Technology File System (NTFS), Unix File System (UFS), Universal Disk Format (UDF), etc. In one or more embodiments, the memory unit formatted with the file system 460 can include a system data area 461 and a user data area 462. The system data area 461 can include format information, e.g., "metadata" 465, that relates to the structure and operation of the file system 460. In the embodiment illustrated in FIG. 4, the system data area 461 includes a number of sections such as a partition boot record 464, a reserved area 466, a first file allocation table 468, a second file allocation table 470, and a root directory 472.

Partition boot record (PBR) 464 is illustrated as the first area in the file system 460. PBR 464 can include either or both of a master boot record and a volume boot record. For example, PBR 464 can include code for booting an operating system or other programs stored in other areas of the storage volume. The PBR 464 can include format information, e.g., file system metadata 465. Format information, e.g., file system metadata 465, can include physical parameters, such as memory size, page size, block size, file system type, media type, memory cell type, and sizes and/or starting addresses of a number of sections of the file system, among other parameters. Although metadata 465 is illustrated as being within the PBR 464, embodiments are not so limited. For example, metadata 465 can be located in one or more other sections of the system data area 461. File system metadata 465 may include information that can allow identification of the type of file system that contains the metadata.

The reserved area 466 may generally be left empty. Some applications that may use reserved area 466 include multi-boot loaders, security applications, etc.

File allocation tables 468 and 470, can contain a list of entries that map to each addressed portion of the user data area 462. Such addressed portions may be referred to as allocation units, e.g., clusters. As some operating systems for computing devices may be designed to work with storage volumes on hard disk drives, such operating systems may use clusters as allocation units, where the cluster is a number of sequential track sectors on the disk. Using a cluster as an allocation unit for a solid state memory device, however, does not require that portions of the cluster, e.g., a number of sectors, be continuous. The file allocation tables 468 and 470 can contain information about which portions of the user data area 462 have data stored, are free, are possibly unusable, and where data is stored in the memory unit. In various embodiments, two file allocation tables can store redundant information such that one can act as a backup for a potential failure of the other file allocation table, e.g., File Allocation Table 2 can be a redundant copy of File Allocation Table 1.

Root directory 472 can contain file and/or directory information such as name, type, creation information, size, address of the first portion of the file and/or directory, and other information. A dedicated root directory 472, as illustrated in FIG. 4, may generally be used with FAT12 and FAT16 file systems. Other file systems, FAT32 for example, may store information associated with the root directory 472 in the user data area 462.

In the embodiment illustrated in FIG. 4, user data can be data received from a host system, such as host system 102 shown in FIG. 1. User data can be written to, read from, and erased from user data area 462 a number of times. In one or more embodiments, the end 476 of the system data area 461 and/or the beginning 476 of the user data area 462 can be adjacent to each other by logical addresses. For example, if the ending logical address of the system data area 461 is 0020 then the starting logical address of the user data area 462 is 0021. Thus, the offset 474, as illustrated in FIG. 4, can be within the user data area 462. The offset 474 is described in more detail herein.

Prior to use for data storage, a memory unit can be formatted such that data structures are installed that both organize the memory unit and provide an abstraction layer to the host. The abstraction layer provided by formatting allows different capacity devices, different media types, and different interface types to provide the host with a common method of access to the memory unit. Formatting the memory unit can include writing PBR data including file system metadata 465, where the PBR 464 can allocate space in the memory unit for system data and user data.

A memory controller, e.g., memory controller 101 in FIG. 1, can detect the memory unit formatting operation and inspect metadata 465 associated with the file system 460 formatted to the memory unit. Subsequently, in response to detecting the formatting operation, the memory controller can determine a starting logical address 476 of a user data area 462 of the memory unit according to the file system metadata 465. The controller can calculate a logical address offset 474, which, as applied to the starting logical address of the user data area 462 corresponds to a beginning of one or more of a physical page of memory cells, e.g., a physical page boundary, and a physical block of memory cells, e.g., a physical block boundary. In one or more embodiments, the logical address offset 474 can be equal to the difference in logical addresses between an end 476 of the system data area 461 and a beginning 478 of a subsequent one or more of a physical page of memory cells and a physical block of memory cells. For example, if the last logical address associated with the system data area 461 is 0030 and the logical address associated with the beginning of the next block is 0032, then the logical address offset 474 is 0002. The calculated logical address offset 474 can be saved in a memory, e.g., a non-volatile memory, of the controller for subsequent use.

The controller can apply the logical address offset 474 to a host LBA that is equal to or greater than the starting address of the user data area 462. In one or more embodiments, the controller can apply the logical address offset 474 to all host LBAs that are equal to or greater than the starting address of the user data area 462. As such, an address that the host attempts to access, e.g., write, read, or erase, within the user data area 462 can have the offset applied to it. The host may not have knowledge of the offset being applied and may operate accordingly. However, the controller can apply the offset to user data logical addresses such that the effective beginning of the user data area 462 is offset to a beginning of one or more of a physical page of memory cells and a physical block of memory cells, e.g., a page and/or block boundary. Applying the logical address offset 474 to host LBAs can include adding the offset 474 to logical addresses accessed by the host in the user data area 462.

In one or more embodiments, the controller can use page size, block size, and/or file system metadata 465 to calculate an offset 474. The controller can use knowledge of the organization of the memory unit, in particular, the write or erase size, the number of sectors in a page, the number of pages in a block, metadata 465, the location of sections of the file system 460, and the file system 460 type to calculate the offset 474. The use of offset 474 can align the start of the user data 462 section with a page and/or block boundary. In one or more embodiments, as described herein, offsets can be calculated for other sections of the file system 460, e.g., PBR 464, reserved section 466, FAT1 468, FAT2 470, root directory 472, etc. As such, the beginning of one or more of the sections of the file system 460 can be aligned with a page and/or block boundary.

The user data area 462 can be quantitized to "allocation units," where a number of logical blocks are represented or allocated by a single allocation entry, called an allocation unit. An allocation unit can be the smallest amount of space that can be allocated to store a single file. An allocation unit can include one or more sectors. For example, FAT type file systems may organize the allocation units into groups of 512 byte sectors in increasing powers of 2, starting with a 1:1 allocation unit to logical block mapping for smaller capacity devices, up to 64 sectors per allocation unit, or more. As each sector has a unique LBA, addressing for allocation units can employ a modulus. For example, in the case of 64 sectors per allocation unit, accesses by the host will occur at addresses that have a modulus of 64. According to one or more embodiments of the present disclosure, the logical address offset 474 can be used to align the starting address of user data, e.g., the beginning of user data 478 with an allocation unit boundary of the file system 460. In one or more embodiments, the allocation unit boundary can be a cluster boundary.

A physical sector of a memory system can correspond to a logical sector and can include overhead information, such as error correction code (ECC) information, and logical block address (LBA) information, as well as user data. As one of ordinary skill in the art will appreciate, logical block addressing is a scheme often used by a host for identifying a logical sector of information. As an example, each physical sector can store information representing a number of bytes of data, e.g., 256 bytes, 512 bytes, or 1,024 bytes, among other numbers of bytes. However, embodiments of the present disclosure are not limited to a particular number of bytes of data stored in a physical sector or associated with a logical sector.

Applying a logical address offset to host LBAs within the user data area in accordance with one or more embodiments of the present disclosure can reduce the amount of operating overhead associated with writing and/or erasing data in some instances. With respect to writing, overhead can refer to data associated with a number of additional memory cells that are copied or moved in addition to the data written to the memory cells addressed by a write command. With respect to erasing, overhead can refer to data associated with a number of memory cells that are copied or moved in order to retain the data that is not intended to be erased. For example, if the end 476 of the system data area 461 coincides with the beginning 478 of user data, as may be the case in some previous approaches, e.g., if a logical address offset is not used, then system data and user data may be written to the same page and/or block. For such a block, an erase operation for either system data or user data in the block would include erasing both system and user data. For such a page, a writing operation for either system or user data would include moving or copying the system or user data not being written. The reduction in overhead according to one or more embodiments of the present disclosure can be based at least partially on providing a page and/or block boundary separation between system data and user data such that writing and/or erasing operations performed on system data or user data near the boundary will affect only the targeted system or user data.

In one or more embodiments, applying a logical address offset to host LBAs accessing the user data area 462 can complement wear leveling that can be implemented to control the wear rate of a memory unit, e.g. memory unit 132 in FIG. 1. In various embodiments, wear leveling can include dynamic wear leveling to minimize the amount of valid blocks moved to reclaim a block. Dynamic wear leveling can include a technique called garbage collection in which blocks with a number of invalid pages (i.e., pages with data that has been re-written to a different page and/or is no longer needed on the invalid pages) are reclaimed by erasing the block. Static wear leveling includes writing static data to blocks that have high erase counts to prolong the life of the block. As one of ordinary skill in the art will appreciate, wear leveling can increase the life of solid state memory since solid state memory can experience failure after a number of write and/or erase cycles. Applying a logical address offset to host LBAs accessing the user data area 462 can help reduce overhead, as described herein, and thereby reduce the overall number of writing and/or erasing operations near the end 476 of the system data area 461 and the beginning 478 of user data.

In one or more embodiments, the controller can inspect metadata 465, determine the starting logical address of the user data area 462, and calculate the logical address offset 474 during and/or in response to a formatting operation and before any user data is written to the user data area 462. Such embodiments can be useful to help prevent the logical address offset 474 from being applied to host LBAs in instances where user data had been written to the user data area 462 before the logical address offset 474 was calculated. In such instances, calculating a logical address offset 474 and applying it to host LBAs could result in an inability to recover the user data written prior to calculation of the offset. That is, a host LBA attempting to access the previously written user data could have the offset applied to it and could yield a starting logical address different than the starting logical address of the previously written user data. For example, if the previously written user data started at logical address 0050, and subsequently, a logical address offset of 0008 were calculated, future attempts by the host system to access the previously written user data at 0050 would result in accesses to logical address 0058 by application of the offset.

An example of a situation where such circumstances could arise is that of a memory unit where format operations are not monitored or detected and a logical address offset is calculated at power on. In such an example, the device would use the logical address offset calculated at power on while a new format was being applied. Without dynamically monitoring and detecting the format operation, upon the next power cycle, the device would calculate a new logical address offset, and if the newly calculated offset was different than the logical address offset that was active during the format operation, the file system would be corrupted.

According to one or more embodiments of the present disclosure, logical address offsets are calculated and applied subsequent to detection of a formatting operation to help prevent such circumstances. Likewise, according to one or more embodiments of the present disclosure, the memory unit can be operated without using a logical address offset 474 prior to detecting a formatting operation. Such embodiments may be particularly useful in instances where a controller according to the present disclosure operates a memory unit that had previously been formatted and controlled without the use of a logical address offset.

In one or more embodiments, a memory controller can be configured to detect whether user data has been written to a user data area 462 of a memory unit in response to being coupled with the memory unit. In such embodiments, the controller can be configured to operate the memory unit using a default logical address offset and/or an existing saved logical address offset 474 in response to detecting that user data had previously been written to the user data area 462. For example, a default logical address offset could be 0 such that as applied to host LBAs, the default logical address offset does not alter host LBAs. Such embodiments can be beneficial as described above for helping to prevent data access errors, among other benefits.

The logical address offset 474 can be saved in memory, e.g., non-volatile memory, of the controller, for example, in memory 210 of controller 201 in FIG. 2. Accordingly, the same logical address offset 474 can be applied to logical addresses accessed by the host within the user data area 462 until a subsequent formatting operation is detected. As described herein, such embodiments can be beneficial in helping to ensure that data can be accessed correctly. For example, if a logical address offset 474 is used for host LBAs within a user data area 462, the same offset can be used for the file system 460 throughout operation of the memory unit. If a different offset were used without reformatting the storage volume of the memory unit, data access errors could occur as the host system may be unaware of the offset.

In one or more embodiments, a number of sections of the system data area 461, e.g., the PBR 464, the reserved area 466, FAT1 468, FAT2 470, and/or the root directory 472, can be aligned with a physical page and/or physical block boundary. Accordingly, although not illustrated in FIG. 4, a number of additional logical address offsets for a number of sections of the system data area 461 can be calculated by the controller after detecting a formatting operation using file system 460 metadata 465. As used herein, an "additional" logical address offset is a logical address offset other than the logical address offset 474 for the user data area 462. An additional logical address offset that is calculated by the controller can be saved in memory, e.g., non-volatile memory, of the controller as is the case with the logical address offset 474 for the user data area 462. That is, in one or more embodiments, the controller memory can store more than one logical address offset. The controller can determine a starting address of a number of sections of the system data area 461. An additional logical address offset for a particular section of the system data area 461 can be applied to a host LBA accessing the particular section such that data associated with the particular section starts at a physical page and/or physical block boundary. For example a logical address offset for FAT1 468 can be applied by the controller to a host LBA within FAT1 468.

In one or more embodiments, control circuitry in a controller, such as controller 101, for example, can communicate commands to a memory unit such that data is written to the memory unit in a particular manner. The commands from control circuitry in the controller can be configured to write data at the beginning of a page for the data that is associated with a particular command by calculating an applying an offset to host LBAs. Also, in one or more embodiments, commands from the control circuitry in the controller can be configured to write data at a first page of a physical block, e.g., physical block boundary, when writing data to an erased block by calculating an applying an offset to host LBAs. In one or more embodiments, the command from the controller can write data to the first memory cell of a page, e.g., page boundary, of a memory array and/or by writing data to the beginning of an empty, e.g., erased, page by calculating an applying an offset to host LBAs. Such embodiments can reduce instances of data erasing and rewriting because host LBAs will be offset to start at the beginning of a physical page and/or physical block, which does not require moving or copying sectors in a preceding physical page and/or physical block as may occur in some previous approaches.

In one or more embodiments, a number of blocks can be designated as spare blocks to reduce the amount of write amplification associated with writing data in the memory array. A spare block may not be mapped to host logical addresses and therefore may not be accessible by a host system. A controller can write data, e.g., data updated from a different block, to a spare block before erasing the different block. When the different block is erased, it can become the new spare block. For example, if a device has 100,000 LBAs, it may report fewer than 100,000 LBAs to a host and use the difference for internal use, e.g., internal use by a controller. Write amplification is a process that occurs when writing data to solid state memory arrays. When randomly writing data in a memory array, the memory array scans for free space in the array. Free space in a memory array can be individual cells, pages, and/or blocks of memory cells that are not programmed. If there is enough free space to write the data, then the data is written to the free space in the memory array. If there is not enough free space in one location, the data in the memory array is rearranged by erasing, moving, and rewriting the data that is already present in the memory array to a new location leaving free space for the new data that is to be written in the memory array. The rearranging of old data in the memory array can be called write amplification because the amount of writing the memory arrays has to do in order to write new data is amplified based upon the amount of free space in the memory array and the size of the new data that is to be written on the memory array. Write amplification can be reduced by increasing the amount of space on a memory array that is designated as free space (i.e., where static data will not be written), thus allowing for less amplification of the amount of data that has to be written because less data will have to be rearranged.

In one or more embodiments, calculating and applying an offset to host LBAs can be used to reduce the amount of write amplification and also reduce the amount of designated free space needed to control write amplification to desired levels. Applying an offset to host LBAs can cause a memory array to be filled with data in an efficient manner, starting at the boundaries of physical block and pages, therefore a data string in a formatted memory array will not start in the middle of a physical block and/or page, thus decreasing the chance that the data string will need to be rewritten to another location to free up space in the memory array for new data.

In one or more embodiments, the system data and the user data that is written to the memory unit can be aligned with the physical structure of the memory unit. That is, data is written at the beginning of a physical block when writing to an erased block and data is written at the beginning of a physical page when writing to an erased page. Also, in some embodiments, data will not be written to a partially written page and the data will be written to the next available erased page.

CONCLUSION

The present disclosure includes methods, devices, and systems for a logical address offset. One method embodiment includes detecting a memory unit formatting operation. Subsequently, in response to detecting the formatting operation, the method includes inspecting format information on the memory unit, calculating a logical address offset, and applying the offset to a host logical address.

It will be understood that when an element is referred to as being "on," "connected to" or "coupled with" another element, it can be directly on, connected to, or coupled with the other element or intervening elements may be present. In contrast, when an element is referred to as being "directly on," "directly connected to" or "directly coupled with" another element, there are no intervening elements or layers present. As used herein, the term "and/or" includes any and all combinations of one or more of the associated listed items. As used herein the term "or," unless otherwise noted, means logically inclusive or. That is, "A or B" can include (only A), (only B), or (both A and B). In other words, "A or B" can mean "A and/or B" or "one or more of A and B."

It will be understood that, although the terms first, second, etc. may be used herein to describe various elements and that these elements should not be limited by these terms. These terms are only used to distinguish one element from another element. Thus, a first element could be termed a second element without departing from the teachings of the present disclosure.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for operating a memory unit, comprising:
   detecting a memory unit formatting operation that formats the memory unit with a file system;
   operating the memory unit with a default logical address offset or an existing saved logical address offset prior to detecting the memory unit formatting operation; and
   calculating a new logical address offset in response to detecting the formatting operation.

2. The method of claim 1, wherein the method includes applying the new offset to a host logical address.

3. The method of claim 2, wherein the new offset is equal to a difference in logical addresses between an end of a system data area and a beginning of a subsequent physical page of memory cells or a beginning of a subsequent physical block of memory cells.

4. The method of claim 2, wherein the method includes:
   applying the new offset to a starting logical address of the user data area; and
   aligning the new offset starting logical address of the user data area with an allocation unit boundary of the file system.

5. The method of claim 4, wherein the method includes calculating a second offset to be applied to host logical addresses that are within the system data area.

6. The method of claim 1, wherein the method includes inspecting format information on the memory unit in response to detecting the formatting operation.

7. The method of claim 6, wherein the method includes determining a starting logical address of a user data area of the memory unit according to the format information.

8. The method of claim 7, wherein the method includes applying a new logical address offset to a host logical address that is equal to or greater than the starting address of the user data area.

9. The method of claim 8, wherein applying the new offset to the host logical address includes adding the new offset to the logical address.

10. The method of claim 8, wherein the method includes using the new offset until a subsequent memory unit formatting operation is detected.

11. The method of claim 1, wherein the method includes applying a new logical address offset to a starting logical address of a user data area; and
    wherein a starting logical address of the new offset corresponds to a beginning of a physical page of memory cells or a beginning of a physical block of memory cells.

12. The method of claim 1, wherein the method includes operating the memory unit with the default logical address offset prior to detecting the memory unit formatting operation.

13. The method of claim 12, wherein the default logical address offset is 0.

14. A memory controller, comprising:
    control circuitry configured to:
    detect a memory unit formatting operation that formats the memory unit with a file system;
    operate the memory unit with a default logical address offset or an existing saved logical address offset prior to detecting the memory unit formatting operation; and
    calculate a new logical address offset in response to detecting the formatting operation.

15. The memory controller of claim 14, wherein the control circuitry is configured to:
    inspect format information on the memory unit in response to detecting the formatting operation; and
    determine a starting logical address of a user data area of the memory unit according to the format information.

16. The memory controller of claim 14, wherein the control circuitry is configured to:
    apply the new offset to a host logical address.

17. The memory controller of claim 16, wherein the new offset as applied to a starting logical address of a user data area of the memory unit corresponds to a beginning of a physical page of memory cells or a beginning of a physical block of memory cells.

18. The memory controller of claim 16, wherein the controller includes memory and the control circuitry is configured to store the new offset in the controller memory.

19. The memory controller of claim 18, wherein the control circuitry is configured to store the new offset until the control circuitry detects a subsequent formatting operation.

20. The memory controller of claim 18, including an adder coupled to the non-volatile memory and to a memory unit interface, wherein the adder is configured to add the new offset to the host logical address prior to the host logical address being sent across the memory unit interface.

21. The memory controller of claim 14, including a number of logical address range comparators configured to compare a host logical address with a range of logical addresses corresponding to a user data area of the memory unit to determine whether the host logical address is within the user data area.

22. A memory system, comprising:
    a memory unit; and
    a memory controller coupled to the memory unit, wherein the memory controller is configured to:
    detect a memory unit formatting operation that formats the memory unit with a file system;
    operate the memory unit with a default logical address offset or an existing saved logical address offset prior to detecting the memory unit formatting operation; and
    subsequently, in response to detecting the formatting operation, calculate a new logical address offset.

23. The memory system of claim 22, wherein, in response to detecting the formatting operation, the controller is configured to:
    inspect format information on the memory unit; and
    determine a starting logical address of a user data area of the memory unit according to the format information.

24. The memory system of claim 23, wherein the memory controller is configured to inspect the format information from a partition boot record of a system data area of the memory unit.

25. The memory system of claim 23, wherein the starting logical address of the user data area is aligned with an allocation unit boundary of the file system.

26. The memory system of claim 25, wherein the allocation unit boundary of the file system comprises a cluster boundary.

27. The memory system of claim 23, wherein, in response to detecting the formatting operation, the controller is configured to apply the new logical address offset to a starting logical address of a user data area of the memory unit corresponding to a beginning of a physical page of memory cells or a beginning of a physical block of memory cells.

28. The memory system of claim 22, wherein, in response to detecting the formatting operation, the controller is configured to:
   apply the first logical address offset to a host logical address.

29. The memory system of claim 22, wherein:
   the memory unit comprises a number of flash memory arrays;
   the memory system includes a host interface connector coupled to the memory controller; and
   the host interface connector, the memory unit, and the memory controller are part of a discrete module.

30. The memory system of claim 22, wherein the memory system comprises a solid state drive.

31. The memory system of claim 22, wherein the memory controller is configured to operate the memory unit with the default logical address offset before the memory controller detects a memory unit formatting operation.

* * * * *